UNITED STATES PATENT OFFICE.

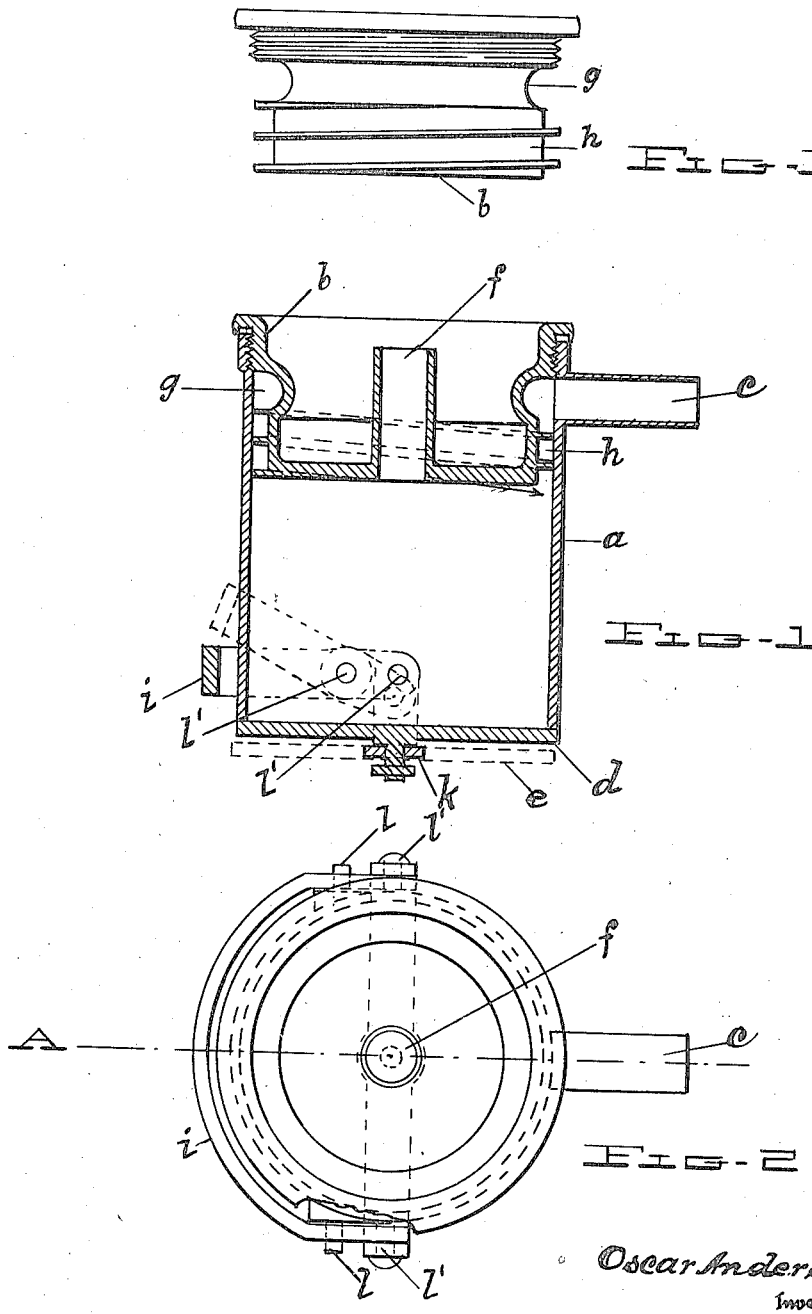

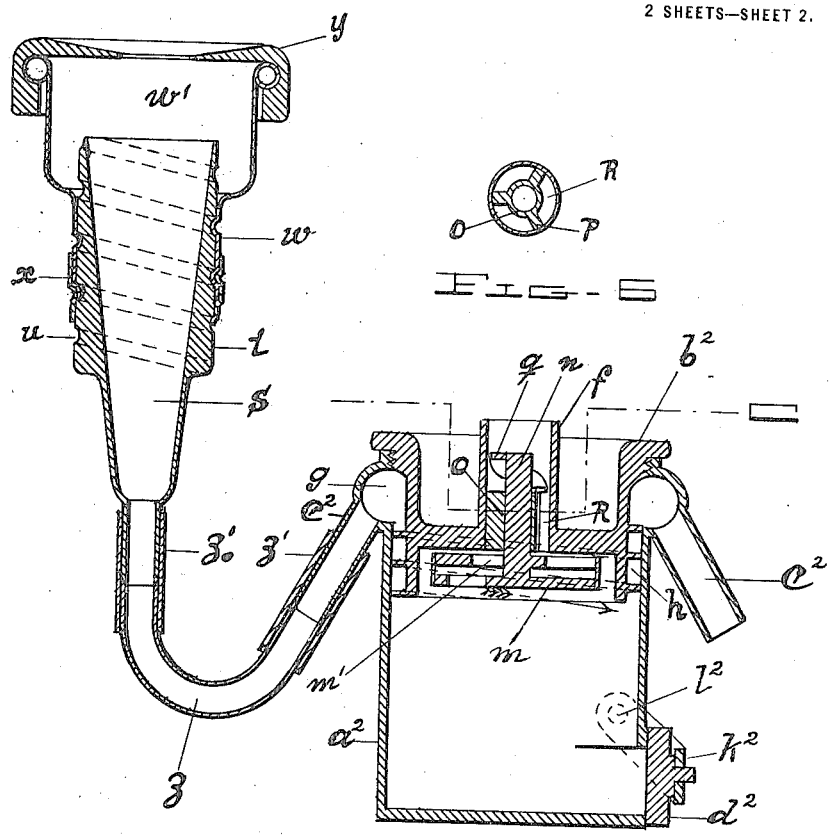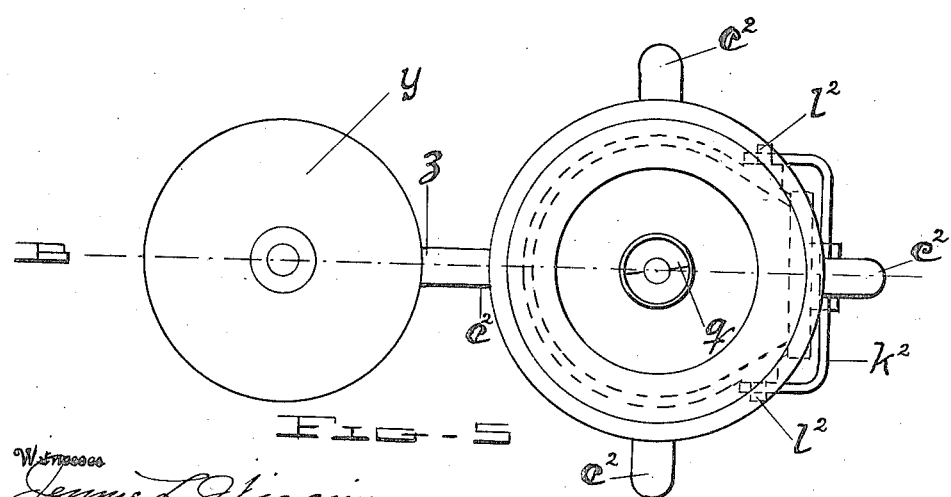

OSCAR ANDERSON, OF LANCASTER, PENNSYLVANIA.

PNEUMATIC MILKING-MACHINE.

1,162,844.　　　　Specification of Letters Patent.　　Patented Dec. 7, 1915.

Application filed December 22, 1914. Serial No. 878,527.

*To all whom it may concern:*

Be it known that I, OSCAR ANDERSON, a citizen of the United States, residing at Lancaster, in the county of Lancaster, State of Pennsylvania, have invented certain Improvements in Pneumatic Milking-Machines, of which the following is a specification.

The improvement set forth in this specification relates particularly to that class of milking machines in which the teat is subject to intermittent or pulsating suction, such as are shown and described in my Patents No. 1,113,942 of October 20, 1914, No. 1,118,257 and No. 1,118,258 of Nov. 24, 1914, and of which this invention set forth in this specification is a further development and simplification.

In pneumatic milking machines using suction as the principal means of drawing the milk from the teats, a certain amount of moisture or foam is drawn with the air by the suction from the milk into the main suction hose and pipelines, where it condenses into liquid, so the pipes have to be drained and cleaned. As this liquid is part of the milk drawn from the teats it is also a loss.

The object of my invention is to eliminate this fault and at the same time provide a simple machine easily cleaned and not easily out of order. Also to provide an adjustable teatcup that can be closely adjusted to any size teat.

To prevent foaming of the milk I provide a cylindrical milk chamber where the milk is kept under centrifugal force, or rotating around the wall of the chamber until it is delivered in the open atmosphere.

To prevent the moisture or vapor from the milk from going with the suction, I place the air drawn by the suction under centrifugal force before or just as it enters the suction line. To accomplish this result, I use, in my preferred construction, a cylindrical milk chamber, having a milk inlet and a milk outlet and a circular spiral passage between the inlet and the outlet, where the milk must pass through. The spiral passage is somewhat restricted so the milk passes through same at a comparatively high rate of velocity and thus receives a rapid rotary motion around the wall of the chamber and continues in motion until the outlet admits its out-flow.

To prevent moisture or foam from going with the air drawn by the suction, I place one or more rotating perforated disks in front of the suction tube, so the air must pass through the perforation. The disks are rotated by the suction or air.

My improvement is illustrated in accompanying drawings in which like numerals of reference indicate corresponding parts in each of the several figures.

Figure 1, is a vertical sectional view of a milk chamber taken at line A, Fig. 2. Fig. 2, is a top view of same and Fig. 3, is a side view of the top or lid of the chamber showing the threads forming the spiral milk passage. Fig. 4, is a sectional view of a milk chamber and an adjustable teat cup, taken at line B, Fig. 5. Fig. 5, is a top view of Fig. 4. Fig. 6, is a cross section taken at line C, Fig. 4.

In Fig. 1, A, is a cylindrical shell. B, is the lid or cover. C, is the milk inlet. D, is the milk outlet valve. The dotted lines E, represent the valve open. F, is the pipe through which suction is applied to the milk chamber and is located in the center of lid B. G, is the annular chamber in the cover, registering with the milk inlets C. H, is the spiral passage formed between lid B and the inside wall of shell A, and preferably as a screwthread on lid B. The valve D is round in Figs. 1 and 2 and forms a false bottom to cylinder A closing up against the end of the cylinder and forming a tight junction therewith and is held in place by a lever I, and link K, hinged or pivoted at L and L'.

In Figs. 4 and 5, M, indicates a pair of perforated disks mounted on shaft, N, which is free to revolve in sleeve O, also shown in Fig. 6. This sleeve is provided with three or more partitions P, which removably secure the sleeve in the tube F, and form air-passages R. On shaft N, above sleeve O, is one or more spiral partitions Q, secured to the shaft and revolving therewith. The teat cup S, is somewhat similar to the one shown in my Patent No. 1,113,942, but a closer and easier adjustment can be made by the improvement. The cup has a common taper-shaped inside wall; the upper part of the outside at T, is cylindrical and provided with a shallow screw thread U. Over this cylindrical part is fitted an extension sleeve W, provided with corresponding screw threads, so when the sleeve W, is rotated on the teat cup it also moves lengthwise on same. X, is a pliable rubber sleeve adapted to make a tight joint. Y, is a rubber mouth piece adapted to receive the teat and form a tight joint therewith. The connection Z, between the teat cup and the milk chamber is U-formed, and consists of metallic tubes held together by rubber nipples Z' forming a flexible connection, perfectly sanitary. This U shaped tube will always retain some milk when in operation, thus keeping the end of the teat moist; it also holds the milk chamber A, up higher so the milk can readily be conveyed through a spout (not shown) to any convenient receiving vessel.

In Fig. 1, the milk chamber is placed on a milk receiving vessel (not shown) and in the usual way connected by hose to the teat cups.

In Figs. 4 and 5 a modification of the milk outlet and its valve is shown, which however resembles the valve shown in my Patent No. 1,118,257, Figs. 9 and 11. The valve $D^2$ is flat and rectangular and its seat on the outside of the cylindrical milk chamber $A^2$ conforms to this shape. Valve $D^2$ is held in position by a yoke $K^2$ pivoted at $L^2$. The valve $D^2$ is not held rigidly in the yoke in order to insure an easy adjustment of the valve to its seat. This valve $D^2$ opens outward and is held in its place so that a slight pressure, more than the weight of the milk, is necessary to open it. This will also act on the teat and, together with the vacuum formed in the chamber W, in the cup, release the lower part of the teat between successive suction impulses. This slight up and down movement of the teat in the taper part of the cup creates some manipulation of the muscular part making an easier milk flow.

In operation pipe F of the milk chamber is connected to suitable suction producing means, and the teat cups are connected to the milk inlet C, either directly as shown in Fig. 4, or by a rubber hose as provided for in Fig. 1, (but not shown). Intermittent suction is applied to the milk chamber and from there to the teat cup; as the cups are applied to the teats they are drawn into the cups. The cups are adjusted with reference to the length of the teat by turning extension sleeve W, so the teat is stretched slightly below the rubber mouth piece Y, and so the lower or muscular part of the teat is squeezed to a certain degree in the taper part of the cup. This combination of suction, stretching and squeezing the teat causes a free flow of the milk. When the suction is cut off, a slight pressure is created, by suitable means, in the milk chamber and transmitted to the teat cup. This, together with the vacuum remaining in chamber W' around the upper part of the teat, will release or draw up the lower part of the teat from the squeezed position in the taper part of the cup. It will also tend to keep the lower end of the teat wet. Each time the suction is applied and cut off the operation is repeated as described. The milk drawn from the teats is conveyed to the milk chamber through tube C, into the annular passage G, then through passage H, where the milk receives a rapid rotary motion. This creates sufficient centrifugal force on the milk to prevent foaming. As long as the suction remains on in the milk chamber, milk is drawn from passage H, and will keep the whole bulk of the milk in rotary motion and as soon as suction is cut off valve D, opens and the milk escapes into a suitable receptacle.

In Fig. 4, I have shown a new arrangement to separate moisture and foam from the air as it is drawn from the milk chamber. It consists of the perforated disks M, being kept in rotary motion in front of the tube F. As described before, disks M, and spiral partitions Q, are securely mounted on shaft N, which revolves in bushing or sleeve O. As suction is applied through tube F, the air passes through perforations $M^1$ in disks M, passages R and strikes the spiral or inclined partition Q, setting same in rotary motion and also rotating disks M; the impetus from each suction will keep the disk in a steady and sufficiently rapid motion to throw off any particles of liquid or moisture that may be in the air as it passes through the perforations of the rotating disks. It will be understood, it is the centrifugal force that separates the moisture from the air.

Having described my invention, I claim:

1. In a pneumatic milking machine a teat-cup having a tapering inner wall, a cylindrical outer wall provided with screw threads, a sleeve movably fitted over said cylindrical part, and provided with corresponding screw threads and means to form a tight joint between the sleeve and the cup, said sleeve being independent of the teat-cup, but forming an adjustable air chamber around the teat, and having means for procuring a tight joint between the sleeve and the udder.

2. In a pneumatic milking machine a rigid teat-cup having a tapering inner wall, a cylindrical outer wall, provided with shallow screw threads, a rigid sleeve, movably fitted over said cylindrical part, and provided with corresponding screw threads, and a resilient sleeve over-lapping both said parts to secure a tight joint between them, said rigid sleeve being independent of the teat-cup, but providing an adjustable air chamber around the upper part of the teat, and having means for securing a tight joint around the teat near the udder.

3. In a milking machine, the combination with a milk chamber, having a milk inlet and a milk outlet and means for producing intermittent suction therein of means providing a spiral passage interposed between said milk inlet and milk outlet.

4. In a milking machine, operated by intermittent suction, a cylindrical milk chamber having milk inlet and milk outlet, a lid or cover extending beyond the milk inlet and forming a spiral milk passage between said milk inlet and milk outlet.

5. In a pneumatic milking machine, a cylindrical milk chamber, having milk inlet and milk outlet, means between said milk inlet and milk outlet to bring the milk into rapid rotary motion whereby the milk may be kept rotating as long as it remains in the chamber.

6. In a pneumatic milking machine, a milk chamber having milk inlet and milk outlet, and means to keep the milk under centrifugal force as long as it remains in said chamber.

7. In a pneumatic milking machine in connection with a teat cup, a milk chamber having milk inlet and milk outlet, and means to place the air drawn from the chamber under centrifugal force in order to remove the moisture therefrom.

8. In a pneumatic milking machine, the combination with a milk chamber having milk inlet and milk outlet and a suction tube opening in the said milk chamber, of rotating perforated disks placed over the end of the suction tube within the milk chamber, said disks being rotated by the suction.

9. In a pneumatic milking machine, the combination with a milk chamber having a milk inlet a milk outlet and a suction connection of a rotating body through which the exhausted air is drawn, said body being adapted to remove moisture from the air and rotated pneumatically.

10. In a milking machine operated by suction, the combination with a milk chamber, a teat cup connected thereto, a suction connection at one end of the chamber of a rotating body located in the suction passage adapted to remove the moisture from the air passing therethrough.

11. In a pneumatic milking machine, the combination with a milk chamber having a removable top part, a milk inlet and a valved outlet of means providing a spiral circular milk passage, interposed between said milk inlet and milk outlet, said milk passage being formed in the removable top part of the chamber.

12. In a pneumatic milking machine, a teat cup having a tapering inner wall, a cylindrical outer wall provided with shallow screw threads, a sleeve movably fitted over said cylindrical part and provided with corresponding screw threads, and means to form an air tight joint between the sleeve and the cup, said sleeve being independent of the teat cup, but forming an adjustable air chamber around the teat near the udder.

13. In a pneumatic milking machine, a milk chamber having milk inlet and milk outlet and a spiral milk passage between said milk inlet and milk outlet, a teat cup connected to said milk inlet.

14. In a milking machine, a milk chamber having milk inlet and milk outlet and a spiral milk passage between said milk inlet and milk outlet adapted to give the milk a rapid rotary motion, and a valve closing the outlet and closed by a hinged lever.

15. In a pneumatic milking machine, a teat cup having a tapering inner wall, a cylindrical outer wall provided with shallow screw threads, a sleeve movably fitted over said cylindrical part and provided with corresponding screw threads; said sleeve being independent of the teat cup but forming an adjustable air chamber around the teat near the udder.

OSCAR ANDERSON.

Witnesses:
 M. H. DIFFENBAUGH,
 E. W. DIFFENBAUGH.